May 10, 1927.                              1,628,184
A. PESTEL
OVERLOAD AND STRAIN RELEASING MECHANISM
Filed April 5, 1921            3 Sheets-Sheet 2
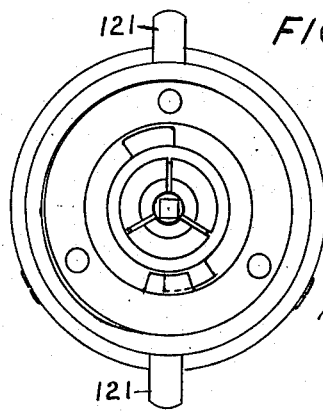
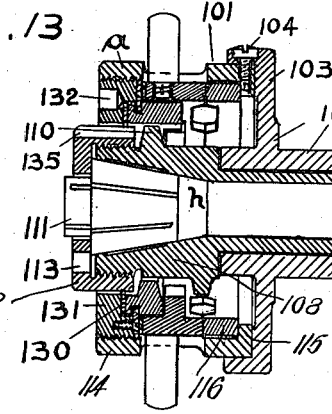
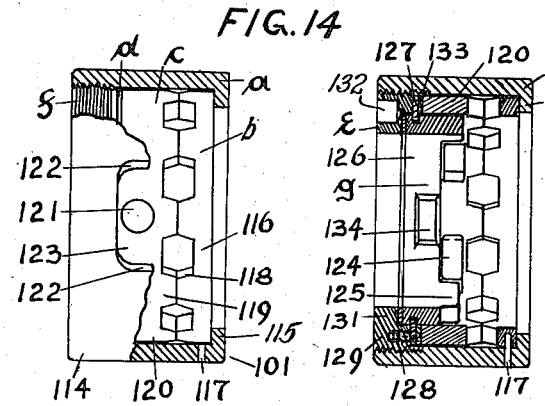
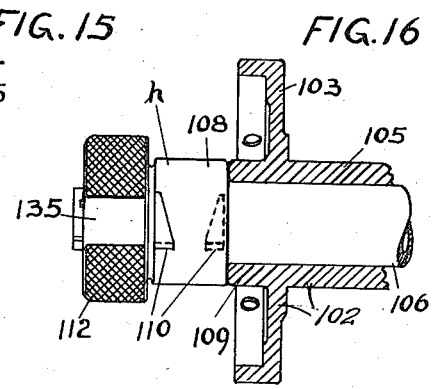
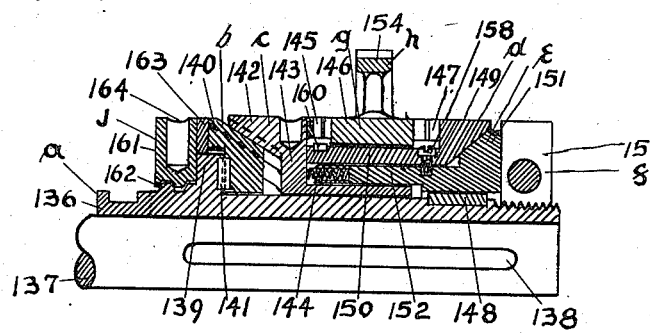
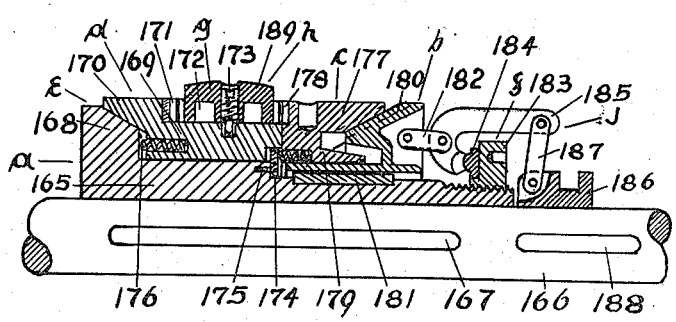
INVENTOR.
Arthur Pestel.

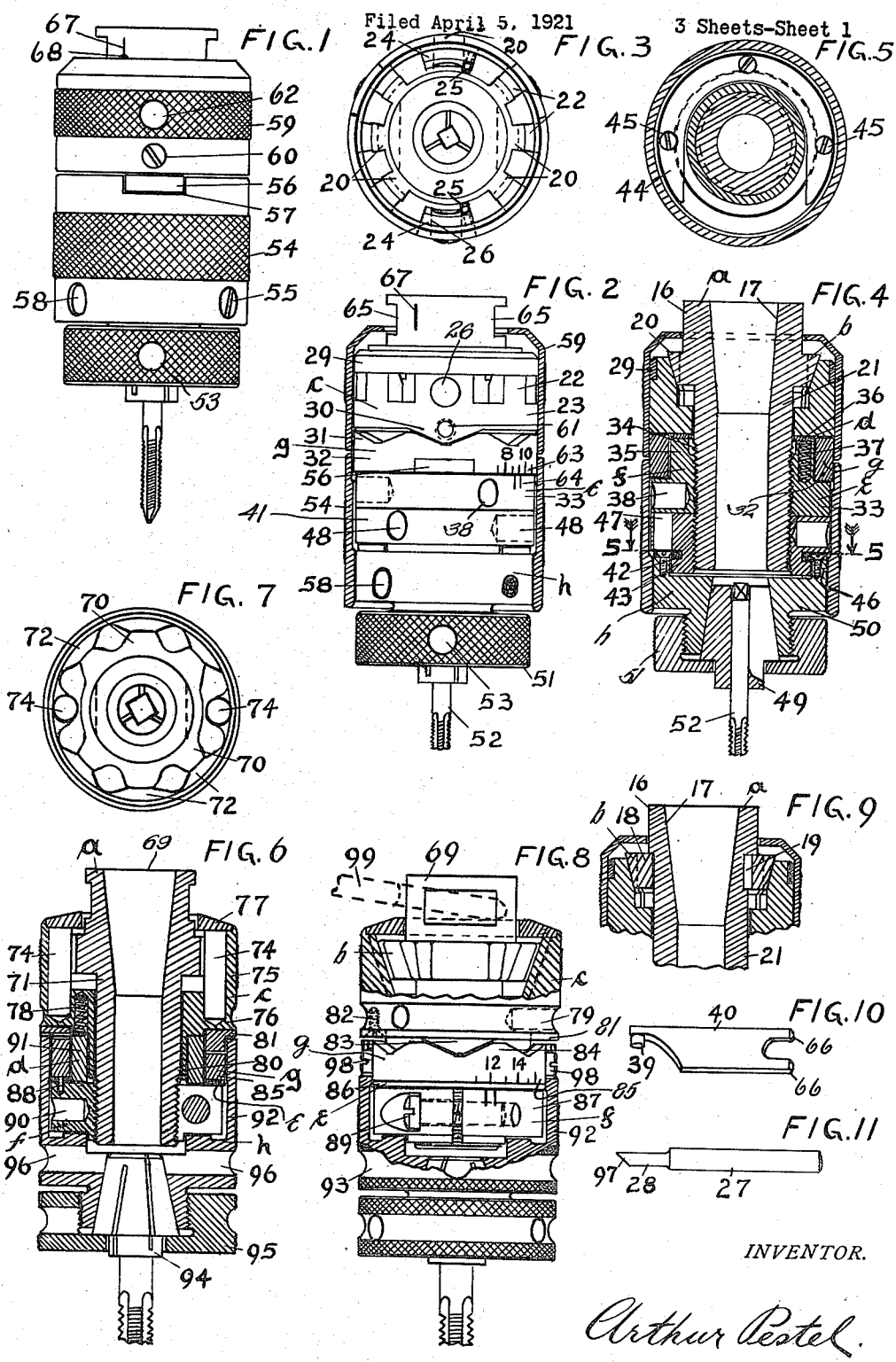

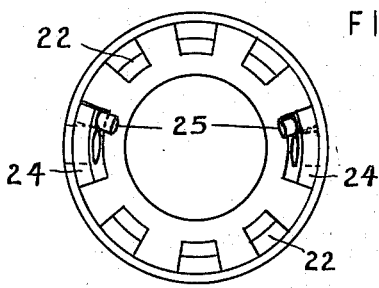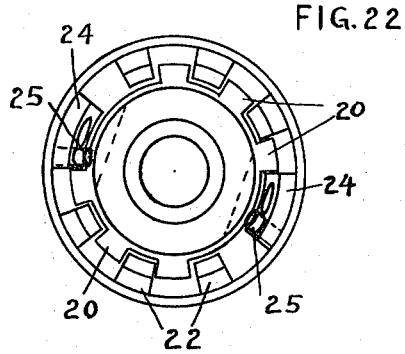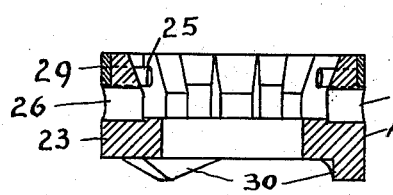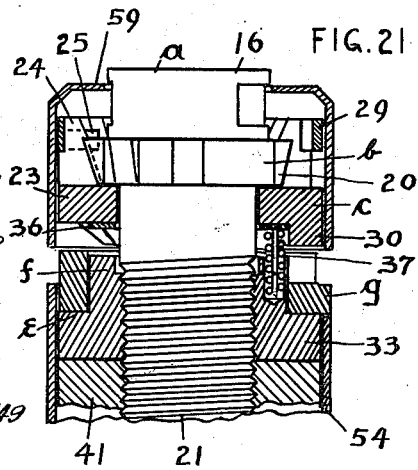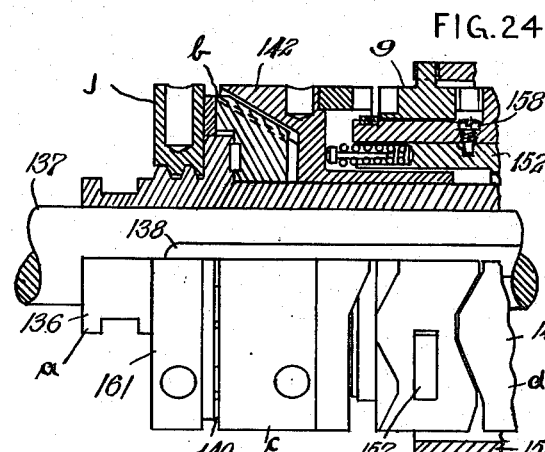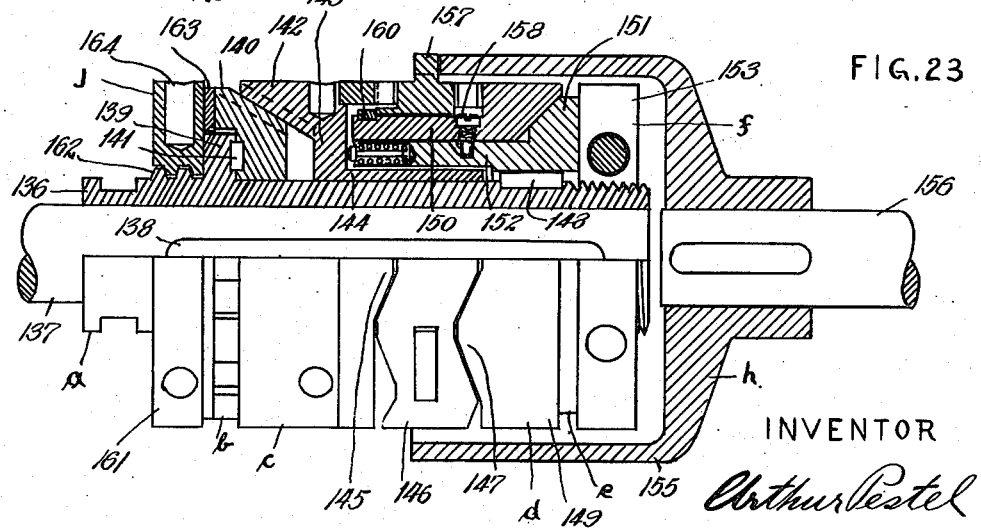

Patented May 10, 1927.

1,628,184

UNITED STATES PATENT OFFICE.

ARTHUR PESTEL, OF NEW YORK, N. Y.

OVERLOAD AND STRAIN RELEASING MECHANISM.

Application filed April 5, 1921. Serial No. 458,787.

This invention relates to improvements in mechanism for releasing overloads and strains and is applicable to different forms of mechanism in which release of overloads and excessive strains on machine parts is desired.

The object of my invention is to provide mechanism, which will eliminate the breaking of machine parts such as shafts and wheels or tools, such as taps and drills or other work performing elements. To do this, a release member is introduced between a driving and a driven member of a machine or device. This release member will give way and release positively, whenever an overload or excessive strain is exerted on the same.

Heretofore it has been customary to provide a positive overload release mechanism, in which the release member was a soft steel pin, which was shorn or broken by the excessive power of the driving member, so that the driven members would cease to operate, until a new breakpin had again been inserted.

The use of breakpins constitutes a certain waste of material, which may amount to a considerable expense if they are employed in devices which are subjected to frequent overloads and excessive strains.

The object of my invention is, to provide mechanism, which will positively make free a release member without the use of a breakpin and its consequent waste of material.

My invention consists of a combination of friction and positive clutch members and is adaptable to different machines and apparatus. It may be used in chucks, tool holders, clutches, couplings and the like.

In carrying out the invention, I utilize the mechanical principle described and shown in the spring operated devices of my U. S. Patent No. 1,449,054, to which reference may be had.

In the accompanying drawings Figs. 1, 2, 3, 4, 5, 9, 19, 20, 21 and 22 show views of a positive release chuck such as may be used for drilling or tapping purposes. Fig. 1 indicates a completely assembled view of the latter. Fig. 2 is a view with cap 59 and sleeve 54 in section. Fig. 3 is a top view of Fig. 2 with cap 59 removed. Fig. 4 is a complete sectional view of Fig. 2 and Fig. 5 a sectional view on line 5—5, Fig. 4.

Figs. 6, 7 and 8 show views of a positive release chuck of a modified design, of which Fig. 6 is a sectional front view, Fig. 7 a top view of the latter with cover 77 removed and Fig. 8 a side view of Fig. 6 with some of its members partly in section. Fig. 9 indicates a partial view of Fig. 4 with a modified design of members $a$ and $b$.

Fig. 10 is a wrench and Fig. 11 a pin, both of which are drawn on a smaller scale.

Figs. 12, 13, 14, 15 and 16 show views of a positive release tapholder, such as are used on screw machines, and turret lathes and of which Fig. 12 is a sectional side view and Fig. 13 a front view of the latter with cap 112 removed. Fig. 14 indicates a side view of unit 101, Fig. 15 a sectional view of same and Fig. 16 a partial side view of unit holder 102.

Fig. 17 is a partial sectional view of an overload release clutch. Fig. 18 is a modified view of the latter.

Figs. 19 and 20 show enlarged views of a release member of positive release chuck Figs. 1 to 5. Fig. 19 is a plan view and Fig. 20 is a sectional side view of said detail. Figs. 21 and 22 show enlarged partial views of positive release chuck Figs. 1 to 5, of which Fig. 21 shows a sectional view with the release member in a disengaged position. Fig. 22 is a plan view of Fig. 21. Figs. 23 and 24 show enlarged partial sectional views of the overload release clutch of Fig. 17. Fig. 23 shows a side view of said clutch with its release member in an engaged position. Fig. 24 shows a part of said side view with the release member disengaged.

Similar numerals and letters refer to similar parts throughout the several views.

Referring to the several views, the different mechanisms shown throughout, consist of the following main functional members, each forming an integral part of all the mechanisms.

$a$ is a principal member, $b$, a toothed friction member, $c$, a release member, $d$, a free friction member, $e$, a fixed friction member, $f$, an adjustable pressure member, $g$, a positive clutch member and $h$, a tool or machine-part holding member.

Referring to Figs. 1, 2, 3, 4, 5, 9, 10 and 11, principal member $a$, which is hollow in the centre, has at its upper end a head 16, in which is a tapered hole 17, to fit the shank of a spindle of a tapping or drilling machine, not shown.

Underneath head 16, is a toothed friction member $b$, which may either form a part with principal member $a$, Fig. 4, or be separate from the latter, forming a ring 18 driven onto a shoulder and prevented from rotation by a key 19 Fig. 9.

The toothed friction member $b$ has rectangular friction teeth 20, 20 with conical friction faces thereon. Said teeth are arranged in two sets of three each, Fig. 3 with wide free spaces between each set.

Freely movable on the shank 21 of member $a$, is located release member $c$, Figs. 19 and 20, having at its upper end rectangular columns forming friction teeth 22, arranged on a ring 23 in the same manner as those of member $b$. On said ring and in the middle of the spaces between each set of said columns are located members 24, 24 of which their inner surfaces are cone shaped and alike to those of friction teeth 22. Each member 24 has extending from its inner cone shaped surface a shock sustaining member in the form of a pin 25 driven into each member 24. 26, 26, indicate holes large enough to permit the smaller cylindrical ends 28 of pins 27 Fig. 11, to enter same.

A steel ring 29 around columns 22 serves the purpose to prevent the latter from being distorted. At the lower end of ring 23 are located positive clutch teeth 30, which are cam shaped and fit into like shaped teeth 31, cut into a ring 32 of a positive clutch member $g$.

The number of teeth on ring 23 is usually three, while those in ring 32 are preferably six in order to facilitate a quick setting for reengagement of release member $c$.

Positive clutch member $g$ rides freely on a friction member $e$, which in this case forms a shoulder 33 of an adjustable pressure member $f$, screwed on the thread 34 of shank 21. The neck 35 of member $f$ is screwed against a free friction member $d$, which forms a washer 36. The latter presses against ring 23 of member $c$, which thus causes the friction teeth 22 to be pressed against friction teeth 20.

While the friction teeth are thus engaged, the positive clutch teeth 31 and 30 are not pressed against each other, but have a very slight play. Located in neck 35 are two or more small spiral springs 37, pressing against washer 36.

Three holes 38 in shoulder 33 are provided to adjust member $f$ and are large enough, to permit extension 39 of wrench 40 Fig. 10 or pin 28 Fig. 11 of like diameter, to enter same.

Below 33, screwed on shank 21, is located a check nut 41 which at its lower end has a groove 42 and a shoulder 43 on which rests a washer 44 Fig. 5, cut open the width of its inner diameter to permit the same to freely enter groove 42. Said washer is fastened with three screws 45 to a tool or machine-part holding member $h$, of which its upper opening, formed by a shoulder 46 fits on the shoulder 43. In order to be able to fasten washer 44 to shoulder 46, a small hole 47 is provided, which has approximately the same diameter as the heads of screws 45, to permit the screws to be entered and fastened to shoulder 46 before nut 41 is screwed on shank 21.

Three holes 48 in nut 41 are similar to those in shoulder 33 and permit tightening nut 41 with either pin 27 or wrench 40.

A conical bushing 49 is pressed into the lower part 50 of holding member $h$ by means of a nut 51. Said bushing is slotted from both ends and has its centre hole square at the top so that tap 52 may be gripped tightly and be prevented from slipping. Nut 51 has three holes 53 serving the same purpose as those in nut 41.

Members $h$ and $g$ are connected with each other, by means of a sleeve 54, fastened to $h$ by means of a screw or screws 55 Fig. 1 and connected to $g$ by means of three tongues 56, forming part of ring 32 and fitting into the three openings 57 of sleeve 54.

Two holes 58, which are similar to and serve the same purpose as those in parts 41 and 51 enter through sleeve 54 into lower part 50.

The protection cap 59 is fastened with three screws 60 Fig. 1, screwed into holes 61 of ring 23, Fig. 2. The two holes 26 in members 24 are in line with holes 62 in cap 59, Fig. 1.

To permit the operator to adjust member $f$ for any pressure desired, indicating marks 63 on ring 32 and marks 64 on shoulder 33 are arranged in such a way, that the pressure may either be indicated in pounds or the numbers of standardized tools as taps or drills or in any other quantity desired. The numbers 8 and 10 as indicated, represent the sizes of a #8 and #10 tap.

The two flat surfaces 65, 65 located at the head 16, serve the purpose, to permit the two tongues 66, 66 of wrench 40, Fig. 10 to grip head 16 in a manner similar to that indicated by a wrench 99, shown in dotted lines in Fig. 8.

Indicating line 67 on head 16 Fig. 1 and button 68 on cap 59 serve the purpose to permit the operator to correctly locate cap 59 and therefore release member $c$ when resetting same.

The operation of the chuck is as follows:

It is assumed that member $f$ has been properly adjusted for a definite pressure, to cause the conical friction teeth 22 of release member $c$ to resist a definite torsional strain a little below the elastic limit of tap 52.

When certain work is to be tapped, the rotating spindle of the machine carrying the chuck transmits power from member $a$ through the friction teeth of member $b$ and friction surface of neck 35 to the release member $c$. From there the power is transmitted to positive clutch member $g$ by means of clutch teeth 30 and 31.

Tongues 56 on member $g$ engaging sleeve 54 will transmit the power through said sleeve to part 50 of holding member $h$ by means of screw 55 and from there to the tap. The resistance on the tap when performing work will cause the cam shaped clutch teeth 30 to exert a pressure through member $g$ on the fixed friction member $e$ on account of their wedge-shaped form thus causing an additional pressure on the friction teeth referred to above.

If the resistance against the work performing tap 52 is in excess of the adjusted frictional resistance of the friction members, it follows that the motion of tap 52 and therefore members $h$, $g$ and $c$ will be retarded, causing thereby a slippage between the friction teeth of members $c$ and $b$. After the friction teeth of member $b$ have passed the edges of the mating friction teeth of member $c$, the latter member will be out of engagement, Figs. 21 and 22, and forced upwards by means of spiral springs 37, as well as the wedge-shaped teeth 31. The friction teeth of member $c$ will enter the free spaces between the teeth 20 of member $b$. This will cause one edge of each member 24 to oppose a corresponding edge of two of the outer friction teeth 20.

The inertia of the mass of release member $c$ during frictional disengagement and positive engagement with member $b$ is met by said edges of friction teeth 20 as well as pins 25.

After member $c$ has been released, it will be noted, that member $a$ is free to rotate, carrying member $c$ with it, while members $g$, and $h$ with tap 52 in the work will remain idle.

The operator will now stop the machine and in order to reset the release member $c$, he will first insert pin 27 in one of the holes 58 and turn back member $h$ with tap 52, approximately one-half or one revolution, to make sure, that the tap in the work is free. After that he will engage the two flat surfaces 65 on head 16 with a wrench 99 and press down release member $c$ in the manner indicated with dotted lines in Fig. 8. The operator will now turn member $c$ to its former engaged position with pin 27 engaging one of the holes 26 of the release member, and the chuck will again be ready for operation.

Referring to Figs. 6, 7 and 8 which show a modification of the chuck already described, principal member $a$ is similar to that shown in Figs. 2, 3 and 4, having near its head 69 a toothed friction member $b$, which either may form a part with principal member $a$ or is made separate from the latter in the manner indicated in Fig. 9. Member $b$ has conical friction teeth 70, in sets of three each and similar to teeth 20, Fig. 3.

Member $c$ movably located on shank 71, has conical friction teeth 72. In the middle of the space between each set of friction teeth 72, are located shock sustaining members in the form of pins 74, driven and held in the rim 75 and middle part of 76 of member $c$. 77 is a cover located at the top of rim 75.

In the middle part 76 are located several spiral springs 78 and three holes 79 to fit pin 27. A sleeve 80, forming an extension of release member $c$ serves the purpose to better guide the latter during operation. A flat ring 81, fastened to 76 in any suitable manner, as screws 82, Fig. 8 has at its lower side three cam shaped positive clutch teeth 83, engaging clutch teeth 84 of ring 85, forming a positive clutch member $g$. The latter rides freely on a fixed friction member $e$, which in this case forms a washer 86, preferably made of a harder material than that of the threaded ring 87, which forms an adjustable pressure member $f$. Washer 86 may be prevented from turning by means of a small pin 88 entering threaded ring 87, Fig. 6.

It is of course understood, that washer 86 may also be loose, enabling it to slip, or it may be eliminated entirely. In either one of the two cases, the upper part of the ring 87 would be designated as the fixed friction member $e$.

Ring 87 is slotted and has passing through it a screw 89, to tighten the former to the thread on shank 71. It has also several holes 90, serving the same purpose as holes 38, Fig. 4, and is screwed against a free friction member $d$, which forms a ring 91, Fig. 6. The latter presses against the lower surface of middle part 76 of member $c$.

Holding member $h$ consists of a sleeve 92 and a lower part 93 with a bushing 94, held tight by a nut 95. When interchanging bushing 94 with one holding a different size tap or drill, it sometimes happens that the bushing will stick, so that difficulty may be experienced to extract it from lower part 93.

To overcome this difficulty, holes 96, which serve the same purpose as holes 58 Fig. 1, are drilled through, so that the operator may enter extension 28 of pin 27, Fig. 11 and with the slanted end 97, force down bushing 94 with a light blow.

Two screws 98, 98 are screwed into ring 85. Their heads pass through sleeve 92 and thus cause to connect the positive clutch member $g$ with holding member $h$.

The operation of this chuck is similar to the one formerly described.

The rotating spindle of the machine carrying the chuck, transmits its power from member a through the friction teeth of member b to the friction teeth of member c. It also transmits its power through the adjustable pressure member f to the free friction member d to the lower surface of part 76 forming a part of member c. The power will then be transmitted from said member c through clutch teeth 83 and 84 to positive clutch member g and from there through the heads of screws 98 to holding member h and to the tap.

If the load on the tap is excessive, member c will be caused to retard its motion by means of its connections with member h and after having passed the edges of the mating friction teeth of member b, will be out of frictional engagement. Member c will be forced upward by means of spiral springs 78, thus disengaging from clutch member g and positively engaging with the teeth of member b, Fig. 22. The blow exerted on member c by the edges of friction teeth 70 of member b is met by pins 74 of release member c. The reengagement of the release member requires the same operation as that related to the device shown in Figs. 1 to 5.

Referring to Figs. 12, 13, 14, 15 and 16, 101 is an interchangeable unit, held to unit holder 102 in a rim 103 with three screws 104. 105 indicates a shank, made to fit into the head of the turret of a screw machine and to be clamped thereto in any well-known manner. Rotatable in said shank is a hollow spindle 106 having fast thereto at one end a stop washer 107. At the other end, forming part of the shank is a tool or machine-part holding member h, consisting of an enlarged end portion 108, Fig. 16, facing a shoulder 109 extended from rim 103.

End portion 108 has at its circumference two separate cam shaped extensions 110, pointing in two different directions and displaced from each other at an angle of 180 degrees.

Bushing 111, which is similar to bushing 94, is held tight in 108 by a nut 112, which has two or more holes 113, to tighten the same with a wrench or pin.

Referring to unit 101, the principal member a is a cylinder 114, having at one end a shoulder 115 against which rests the toothed friction member b, formed by a ring 116 and prevented from rotating by means of a pin 117. Friction teeth 118 have straight friction faces instead of conical and are shown to be in engagement with friction teeth 119 of ring 120 forming a release member c. The latter is partly rotatable in cylinder 114.

Two pins 121 are fast to ring 120 and serve the purpose to meet the shock exerted during disengagement at the edges 122 of opening 123 in cylinder 114, Fig. 14. These pins also enable the operator to reset release member c without the aid of any auxiliary means, as a wrench or pin.

On the inside of ring 120 are located straight positive clutch teeth 124 engaging like teeth 125 arranged at one end of a ring 126 forming a positive clutch member g. The other end of ring 126 has a groove into which enters a washer 127 which is similar to washer 44 Fig. 5. Washer 127 is fastened with screws 128 to a threaded ring 129, forming an adjustable pressure member f. Between shoulder 131, which forms a fixed friction member e and ring 126 is freely located a washer 130. Three holes 132 are provided for the adjustment of pressure member f.

A free friction member d in form of a washer 133 is located between washer 127 and ring 120 and pressed against the latter by the pressure member f.

Located on the inside of ring 126 is a tooth shaped extension 134 provided for engagement with either one of the cam shaped extensions 110. A groove 135 in nut 111 has the approximate width of extension 134 and is cut deep enough, to permit said extension to freely pass nut 111 if unit 101 is interchanged for another having a different adjustment of pressure for a different size tap or drill.

The operation of the tapholder is similar to that of the chucks described. The tapholder which is fastened in the turret head of a screw machine is fed against the work rotating in a chuck of said machine, forcing the tap and the holding member h against shoulder 109, thus allowing the front extension 110 to engage the tooth shaped extension 134, forcing ring 126 to rotate in a clock wise direction when looking at the front face of the tap holder as shown in Fig. 13. The friction caused on the friction faces of teeth 118 and 119 by the pressure of member f, will prevent rings 120 and 126 from rotating, but will slip, if the strain on the tap is near its breaking point. Release member c will release in a manner already described. To position member g for engagement with member c, the operator will turn the former by means of member h until the clutch teeth of members c and g are in line and can be made to engage each other when drawing forward release member c with the two pins 121.

If however member c has not been released and the tap has threaded the work its full depth, the rotation of the chuck in the screw machine is reversed, the turret head and therefore the tapholder and tap is drawn back. This will draw holding member h forward until stop washer 107 rests against shank 105. The rear extension 110 will now engage extension 134 and the strain on ring 126 will tend to rotate release member c in an anti clock wise direction when looking at the front face of the tap holder as shown in Fig. 13.

Referring to Fig. 17, which indicates a clutch to be used on power transmission shafts, or spindles and shafts of machines which occasionally are subjected to overloads or excessive strains the principal member a forms a sleeve 136, fastened to a shaft 137 by means of a key 138. Against shoulder 139 is held a conical shaped ring 140, forming a toothed friction member b, similar to those shown in Figs. 1 to 9. Ring 140 is slightly movable in an axial direction but is prevented from rotating by means of a key 141 fast in shoulder 139. Release member c formed by a rim 142, middle part 143 and sleeve 144, is alike to member c shown in Figs. 6, 7 and 8.

Fast to part 143 is a ring having positive cam shaped clutch teeth 145, engaging similar clutch teeth fast to hub 146, forming a positive clutch member g. At the other end of hub 146 is a like set of cam shaped clutch teeth, engaging a set of like clutch teeth 147, fast to a free friction member d consisting of a conical friction head 149 and a bearing sleeve 150, rotatable on a sleeve 152. The conical friction face of head 149 engages a like friction face of head 151 on sleeve 152 forming a fixed friction member e. The latter is prevented from rotating by means of a key 148 fast in sleeve 136.

The adjustable pressure member f is a nut 153, alike to nut 87, Figs. 6 and 8. The tool or machine-part holding member h, is a gear rim 154 connected to hub 146.

A screw 158 in sleeve 150 extends into a groove in sleeve 152 to prevent member d from making a too great lateral movement on e. A split ring 160 slipped on sleeve 150, positions hub 146, permitting the latter to make a slight lateral movement only.

The disengaging device j, consists of a nut 161 screwed on a coarse thread 162 and against shoulder 139 of sleeve 136. The pressure exerted from member f on toothed friction member b and from this through a washer 163 on the nut 161, may be temporarily relieved when partly turning the latter by means of a pin or wrench, to be entered in holes 164.

The operation of the clutch is similar to that of the chucks shown in Figs. 1 to 9. The extra conical friction faces of heads 149 and 151 permit the device to be used for heavy loads and the additional pressure caused by the two sets of cam shaped positive clutch teeth on head 149 and hub 146 increases the pulling power of the clutch while in operation.

The disengaging device j, serves the purpose to facilitate resetting the clutch. To do that, the operator will loosen nut 161, turn release member c until its friction faces are opposite to those of member b and then again tighten nut 161 against shoulder 139.

Referring to Fig. 18, which indicates a clutch similar to that shown in Fig. 17, principal member a, which forms a sleeve 165 is held to a shaft 166 by a key 167 and has at one end a head 168, forming a conical fixed friction member e. The conical free friction member d, consisting of a body 169 and a head 170, rides on sleeve 165 and has at its head a set of cam shaped positive clutch teeth 171 engaging like teeth on positive clutch member g.

The latter which forms a hollowed ring 172, rides on body 169 and is prevented from moving too far away from head 170 by means of a screw 173 entering a groove in body 169. A ring 174 fastened to 165 with screws 175 serves the purpose to meet the pressure exerted from springs 176 on member d, while out of engagement. The holding member h forms a rim 189 on ring 172. The release member c forming a head 177, has cam shaped positive clutch teeth 178 engaging like teeth on clutch member g and differs from other release members shown in Figs. 17 and 6 in that its bearing sleeve 179 extends in a direction towards its friction teeth.

Toothed friction member b forms a slidable member 180, which is prevented from rotating on sleeve 165 by means of a key 181. It is connected with links 182 to a disengaging device j, consisting of an adjustable pressure member f forming a nut 183, a bearing cap 184, levers 185 connected to a sleeve 186 with links 187. Sleeve 186 is slideable on shaft 166 on a key 188.

The disengaging device shown is similar to disengaging mechanism used on ordinary friction clutches of proved efficiency already on the market. If sleeve 186 is moved in a direction away from the clutch, levers 185 will be drawn towards the shaft which will raise links 182 and slide member 180 away from the other members of the clutch. The operator may then locate release member c and reset the clutch mechanism.

The operation of the clutch is otherwise the same as that shown in Fig. 17.

Figs. 23 and 24 illustrate a clutch which is alike to that shown in Fig. 17 and differs only in the form and application of the tool or machine part holding member h. The tool or machine part holding member h of Fig. 23 is shown to be a coupling sleeve 155 fastened to a shaft 156. Sleeve 155 is in engagement with positive clutch teeth 157 forming a part with hub 146. It will be noted that in the chuck shown in Figs. 1 to 5 the pressure caused by springs 37 may be sufficient to cause a resistance on the friction surfaces which will make a small sized tap or drill perform the desired work. In this case it will not be necessary to have neck 35 Figs. 2 and 4, press against member c. The pressure caused by springs 37 against member c would cause an initial frictional resistance against the conical friction surfaces of friction teeth 20 and 22, which resistance would, as already stated elsewhere, be increased by a definite amount by the cam shaped positive clutch teeth 30 and 31.

The latter may be compared to inclined planes arranged on a circle, so that members c and g may be considered wedge members of an inverted type. Both wedge members have friction surfaces at their free ends of which the friction surface of member c is conical and that of member g flat.

The increase of pressure against their respective opposing friction surfaces by the clutch teeth 30 and 31 is dependent on the angularity of the latter which may be of a degree to create the greatest additional pressure without however causing the wedge members to jam or bind.

The mechanism may therefore be considered to be composed of a positive drive and a friction drive of which the former consists of a positive driving member c having driving inclines 30, a positive driven member g having driven inclines 31 and a resisting device 37 forming two or more springs.

The friction drive consists of a transmitting device composed of a shank 21 having a conical friction member b on one end and a flat friction member e on the other, both of which have respective conical and flat friction surfaces. The friction drive also consists of a driving friction element 22 in the form of conical friction teeth and a driven friction element in the form of a flat friction surface on the lower end of ring 32. The friction drive is thus composed of a transmitting device and two sets of friction members and elements having two sets of friction surfaces.

The positive drive and the friction drive may therefore be considered to form a self-contained mechanism to be referred to as a force transmitting unit to be rotated by a force inducing element in form of a shank or taper (not shown) fitting into tapered hole 17. The force transmitted by the force transmitting unit would be resisted by a force resisting element which would be formed by tap 52 or—generally speaking—sleeve 54.

Having thus described my invention, it is understood, that I do not hold myself to the precise construction of these mechanisms and that I consider myself at liberty to vary the arrangements and constructions of same, without departing from the spirit of my invention.

I claim:

1. In mechanism of the character described, a principal member, a toothed friction member fixed thereon, conical friction teeth on said toothed member, a release member guided by said principal member, conical friction teeth on said release member mating those of the toothed member, a pressure member, adjustably mounted on said principal member, means to secure said pressure member to said principal member, a fixed friction member, a conical friction face thereon, a free friction member having a conical friction face mating that of the fixed member, cam shaped positive clutch teeth on said release member and said free friction member, a positive clutch member located between said release and free friction members, a set of cam shaped positive clutch teeth on each side of said positive clutch member, engaging the clutch teeth of said release member and free friction member, said free friction member being located between said positive clutch member and said fixed member, a spring or springs pressing against said release member, a tool or machine part holding member forming part of said positive clutch member, a disengaging device pressing against said toothed friction member, a disengageable element or elements in said device to relieve the pressure on said toothed friction member without affecting the adjustment of said pressure member and means, to reset said release member after a disengagement from said toothed friction and said positive clutch members.

2. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, a fixed friction member, a friction face thereon, a free friction member having a friction face mating that of the fixed member, cam shaped positive clutch teeth on said release member and said free friction member, a positive clutch member located between said release and free friction members, a set of cam shaped positive clutch teeth on each side of said positive clutch member, engaging the clutch teeth of said release and said free friction members respectively, said free friction member being located between said positive clutch member and said fixed member, a spring or springs pressing against said release member, a tool or machine part holding member forming part of said positive clutch member, a disengaging device pressing against said toothed friction member, a disengageable element or elements in said device to relieve the pressure on said toothed friction member without affecting the adjustment of said pressure member and means, to reset said release member after a disengagement from said toothed friction and said positive clutch members.

3. In mechanism of the character described, a principal member, a toothed friction member fixed thereon, conical friction teeth on said toothed member, a release member guided by said principal member, conical friction teeth on said release member mating those of the toothed member, a pressure member, adjustably mounted on said principal member, a fixed friction member, a conical friction face thereon, a free friction member having a conical friction face mating that of the fixed member, positive clutch teeth on said release member and said free friction member, a positive clutch member located between said release and free friction members, a set of positive clutch teeth on each side of said positive clutch member, engaging the clutch teeth of said release and free friction members respectively, said free friction member being located between said positive clutch member and said fixed member, a spring or springs pressing against said release member, a tool or machine part holding member forming part of said positive clutch member, a disengaging device pressing against said toothed friction member, a disengageable element or elements in said device, to relieve the pressure on said toothed friction member and means, to reset said release member after a disengagement from said toothed friction and said positive clutch members.

4. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, a fixed friction member, a friction face thereon, a free friction member having a friction face mating that of the fixed friction member, positive clutch teeth on said release member and said free friction members, a positive clutch member located between said release and free friction members, a set of positive clutch teeth on each side of said positive clutch member engaging the clutch teeth of said release and said free friction members respectively, said free friction member being located between said positive clutch member and said fixed member, a spring or springs pressing against said release member, a tool or machine part holding member forming part of said positive clutch member, a disengaging device pressing against said toothed friction member, a disengageable element or elements in said device to relieve the pressure on said toothed friction member without affecting the adjustment of said pressure member and means to reset said release member after a disengagement from said toothed friction and said positive clutch members.

5. In mechanism of the character described, a principal member, a toothed friction member fixed thereon, conical friction teeth on said toothed member, a release member guided by said principal member, conical friction teeth on said release member mating those of the toothed member, a pressure member, adjustably mounted on said principal member, a fixed friction member, a conical friction face thereon, a free friction member having a conical friction face mating that of the fixed friction member, said free friction member being located between said release and said fixed members, cam shaped positive clutch teeth on said release member, a positive clutch member located between said release and fixed friction members, cam shaped positive clutch teeth on said positive clutch member, engaging the clutch teeth of said release member, a spring or springs pressing against said release member, a tool or machine part holding member forming part of said positive clutch member, a disengaging device pressing against said toothed friction member, a disengageable element or elements in said device to relieve the pressure on said toothed friction member without affecting the adjustment of said pressure member and means to reset said release member after a disengagement from said toothed friction and said positive clutch members.

6. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, a fixed friction member, a friction face thereon, a free friction member having a friction face mating that of the fixed member, said free friction member being located between said release and said fixed members, a positive clutch member located between said release and fixed friction members, positive clutch teeth on said release member and said positive clutch member engaging each other, a spring or springs pressing against said release member, a tool or machine part holding member forming part of said positive clutch member, a disengaging device pressing against said toothed friction member, a disengageable element or elements in said device, to relieve the pressure on said toothed friction member and means to reset said release member after a disengagement from said toothed friction and said positive clutch members.

7. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, a fixed friction member, a friction face thereon, a free friction member having a friction face mating that of the fixed member, said free member being located between said release and said fixed members, positive clutch teeth on said release member and said free friction member, a positive clutch member located between said release and fixed friction members, a set of positive clutch teeth on each side of said positive clutch member engaging the clutch teeth of said release and said free friction members respectively, a spring or springs pressing against said release member, a tool or machine part holding member forming part of said positive clutch member and means to reset said release member after a disengagement from said toothed friction and said positive clutch members.

8. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, a fixed friction member, a friction face thereon, a free friction member having a friction face mating that of the fixed member, said free member being located between said release and said fixed members, a positive clutch member located between said release and fixed friction members, positive clutch teeth on said release member and said positive clutch member engaging each other, a spring or springs pressing against said release member, a tool or machine part holding member forming part of said positive clutch member, and means to reset said release member after a disengagement from said toothed friction and said positive clutch members.

9. In mechanism of the character described, a principal member, a toothed friction member fixed thereon, friction teeth on said toothed member, a release member guided by said principal member, friction teeth on said release member mating those of the toothed member, a pressure member adjustably mounted on said principal member, means to secure said pressure member to said principal member, said pressure member pressing said release member against said toothed friction member, positive clutch teeth on said release member, a positive clutch member with like teeth located between said release and said pressure members in engagement with said release member, a spring or springs pressing against the latter, a tool or machine part holding member forming part of said positive clutch member and means to reset said release member after a disengagement from said toothed friction and said positive clutch members.

10. In mechanism of the character described, a principal member, a toothed friction member, a release member, mating friction teeth on both said toothed and release members, a pressure member pressing said release member against said toothed member, positive clutch teeth on said release member, a positive clutch member with like teeth and located between said release and said pressure members in engagement with said release member and means to reset said release member after a disengagement from said toothed friction and said positive clutch members.

11. In mechanism of the character described, a principal member, a toothed friction member, a release member, mating friction teeth on both said toothed and release members, a pressure member pressing said release member against said toothed member, positive clutch teeth on said release member, a positive clutch member with like teeth and located between said release and said pressure members in engagement with said release member, said positive clutch teeth on both said release and said positive clutch members to cause an additional pressure on said release member against said toothed member while in operation and means to reset said release member after a disengagement from said toothed friction and said positive clutch members.

12. In mechanism of the character described, a friction clutch, friction clutch members therein, adjusted to resist a definite load, friction teeth on said members, positive clutch members in combination with said friction members, one each of said friction and said positive clutch members to release after the former has slipped the length of one of its friction teeth if the adjusted load is exceeded on either one of said friction or positive clutch members.

13. In mechanism of the character described, a friction clutch, resisting members therein, pressure means to cause a frictional resistance by said resisting members, positive clutch members in combination with said resisting members, one each of said positive and resisting members to positively release if the frictional resistance is exceeded on either one of said positive and resisting members.

14. In mechanism of the character described, a friction clutch, resisting members therein, two sets of friction surfaces on said resisting members, pressure means to cause a frictional resistance by said resisting members, positive clutch members in combination with said resisting members and means to positively make free said frictional resistance if exceeded by a resistance on members of said friction clutch.

15. In mechanism of the character described, a friction clutch resisting members therein, two sets of friction surfaces on said resisting members, pressure means to cause a frictional resistance by said resisting members, clutch members having cam shaped teeth in combination with said resisting members and means to positively make free said frictional resistance if exceeded by a resistance on members of said friction clutch.

16. In mechanism of the character described, a friction clutch, resisting members therein, two sets of friction surfaces on said resisting members, clutch members having cam shaped teeth in combination with said resisting members and means to positively make free said frictional resistance if exceeded by a resistance on members of said friction clutch.

17. In mechanism of the character described, a friction clutch, resisting members therein, two sets of friction surfaces on said resisting members, positive clutch members in combination with said resisting members and means to positively make free said frictional resistance if exceeded by a resistance on members of said friction clutch.

18. In mechanism of the character described, a force inducing and a force resisting element, a force transmitting unit, means to connect both said elements with said unit, a positive drive and friction drive forming part of said unit, said positive drive to be operative in either one of two directions of rotation, two sets of friction surfaces in said drive and means to automatically increase the resistance of said friction drive.

19. In mechanism of the character described, a force inducing and a force resisting element, a force transmitting unit, means to connect both said elements with said unit, a positive drive and a friction drive forming part of said unit, said positive drive to be composed of inclines forming an inverted wedge, and means to automatically increase the resistance of said friction drive laterally in two directions on two sets of friction surfaces.

20. In mechanism of the character described, a force inducing and a force resisting element, a force transmitting unit, means to connect both said elements with said unit, a positive drive and a friction drive forming part of said unit, said positive drive to be composed of inclines forming an inverted wedge, a resisting device causing an initial pressure on parts of said friction drive, and means to automatically increase the resistance of said friction drive laterally in two directions on two sets of friction surfaces.

21. In mechanism of the character described, a force inducing and a force resisting element, a force transmitting unit, means to connect both said elements with said unit, a positive drive and a friction drive forming part of said unit, said positive drive to be composed of inclines forming an inverted wedge, a resisting device causing an initial pressure on parts of said friction drive, means to regulate the pressure of said resisting device and further means to automatically increase the resistance of said friction drive laterally in two directions on two sets of friction surfaces.

22. In mechanism of the character described, a force inducing and a force resisting element, a force transmitting unit, means to connect both said elements with said unit, a positive drive and a friction drive forming part of said unit, a resisting device causing an initial pressure on parts of said friction drive and means to automatically increase the resistance of said friction drive laterally in two directions on two sets of friction surfaces.

23. In mechanism of the character described, a force inducing and a force resisting element, a force transmitting unit, a frictional resistance in said unit and means to automatically create an additional resistance on two sets of friction surfaces through said frictional resistance.

24. In mechanism of the character described, a friction drive, an initial frictional resistance in said drive, means to regulate said resistance and further means to automatically create an additional frictional resistance on two sets of friction surfaces through the initial resistance in said friction drive.

25. In mechanism of the character described, a friction drive, an initial frictional resistance in said drive and means to automatically create an additional frictional resistance on two sets of friction surfaces through said initial resistance in said drive.

Signed at New York city in the county and State of New York this 4th day of April, 1921.

ARTHUR PESTEL,